United States Patent
Jou

(10) Patent No.: US 7,139,304 B2
(45) Date of Patent: Nov. 21, 2006

(54) METHOD AND APPARATUS FOR CONTROLLING GAIN LEVEL OF A COMMUNICATION CHANNEL IN A CDMA COMMUNICATION SYSTEM

(75) Inventor: Yu-Cheun Jou, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 635 days.

(21) Appl. No.: 09/928,578

(22) Filed: Aug. 10, 2001

(65) Prior Publication Data

US 2003/0031142 A1  Feb. 13, 2003

(51) Int. Cl.
*H04B 1/707* (2006.01)

(52) U.S. Cl. ...................... 375/147; 375/141

(58) Field of Classification Search ............... 375/141, 375/144, 146, 147, 148; 455/522, 69
See application file for complete search history.

(56) References Cited

U.S. PATENT DOCUMENTS

| 5,793,805 | A |   | 8/1998  | Nikides ................. 375/224 |
| 5,873,028 | A | * | 2/1999  | Nakano et al. ........... 455/69  |
| 6,400,929 | B1| * | 6/2002  | Ue et al. ................ 455/69  |
| 6,735,449 | B1| * | 5/2004  | Tran ..................... 455/522 |
| 2001/0036238 | A1 | * | 11/2001 | Baker et al. ............ 375/358 |

FOREIGN PATENT DOCUMENTS

| WO | 9907105 | 2/1999 |
| WO | 0033478 | 6/2000 |
| WO | 0122756 | 3/2001 |

* cited by examiner

*Primary Examiner*—Jay K. Patel
*Assistant Examiner*—David B. Lugo
(74) *Attorney, Agent, or Firm*—S. Hassain Beladi; Thien Nguyen; Phil Wadsworth

(57) ABSTRACT

In a code division multiple access communication system (100), a method and an accompanying apparatus provide for an efficient control of a gain level of a communication channel at various mobility levels. A rate of change of a carrier to interference ratio (C/I) of a communication channel received at a receiver (400) is determined. The gain level of the communication channel may be based on the rate of change of the C/I of the communication channel. A mobility level of the communication channel may be compared to a low mobility threshold corresponding to a low mobility level. If the mobility level meets the low mobility threshold, the gain level of the communication channel may be based on the rate of change of the C/I of the communication channel.

10 Claims, 6 Drawing Sheets

METHOD AND APPARATUS FOR CONTROLLING GAIN LEVEL OF A COMMUNICATION CHANNEL IN A CDMA COMMUNICATION SYSTEM

FIELD

The present invention relates generally to the field of communications, and more particularly, to communications in a cellular communication system.

BACKGROUND

In code division multiple access (CDMA) communication systems, excessive transmission by a user may cause interference for other users in addition to reducing the system capacity. Therefore, the power level and/or data rate of the communication channels transmitted by different users of the system is controlled to control the interference level and to maintain an adequate system capacity while allowing an adequate quality of reception at a receiving end. The power level and/or data rate of a communication channel may establish the gain level of the communication channel. The communication services may include wireless radio transmission of digitized speech, still or moving images, text messages and other types of data. Such communication services may be needed at various levels of quality and at various levels of mobility.

To this end as well as others, there is a need for an efficient control of the power level and/or data rate of a communication channel at various levels of mobility in a communication system.

SUMMARY

In a code division multiple access communication system, a method and an accompanying apparatus provide for controlling gain level of a communication channel at various levels of mobility. In accordance with various aspects of the invention, a rate of change of a carrier to interference ratio (C/I) of a communication channel received at a receiver is determined. The rate of change of C/I may be directly related to the mobility level experienced by the communication channel. As such, in accordance with an embodiment, a gain level of the communication channel may be based on the rate of change of the C/I of the communication channel. Therefore, the communication services are provided at an efficient channel data rate and/or power level at various levels of mobility.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT(S)

Various embodiments of the invention may be incorporated in a system for wireless communications in accordance with the code division multiple access (CDMA) technique which has been disclosed and described in various standards published by the Telecommunication Industry Association (TIA). Such standards include the TIA/EIA-95 standard, TIA/EIA-IS-2000 standard, IMT-2000 standard and WCDMA standard, all incorporated by reference herein. A system for communication of data described in a document tilted:"TIA/EIA/IS-856 cdma2000 High Rate Packet Data Air Interface Specification," incorporated by reference herein, is more particularly capable of incorporating various embodiments of the invention. A copy of the standards may be obtained by accessing the world wide web or by writing to TIA, Standards and Technology Department, 2500 Wilson Boulevard, Arlington, Va. 22201, United States of America. The standard generally identified as WCDMA standard, incorporated by reference herein, may be obtained by contacting 3GPP Support Office, 650 Route des Lucioles-Sophia Antipolis, Valbonne-France.

Generally stated, a novel and improved method and an accompanying apparatus provide for an efficient control of power level and/or data rate of a communication channel at various levels of mobility in a CDMA communication system. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

Figure 1:
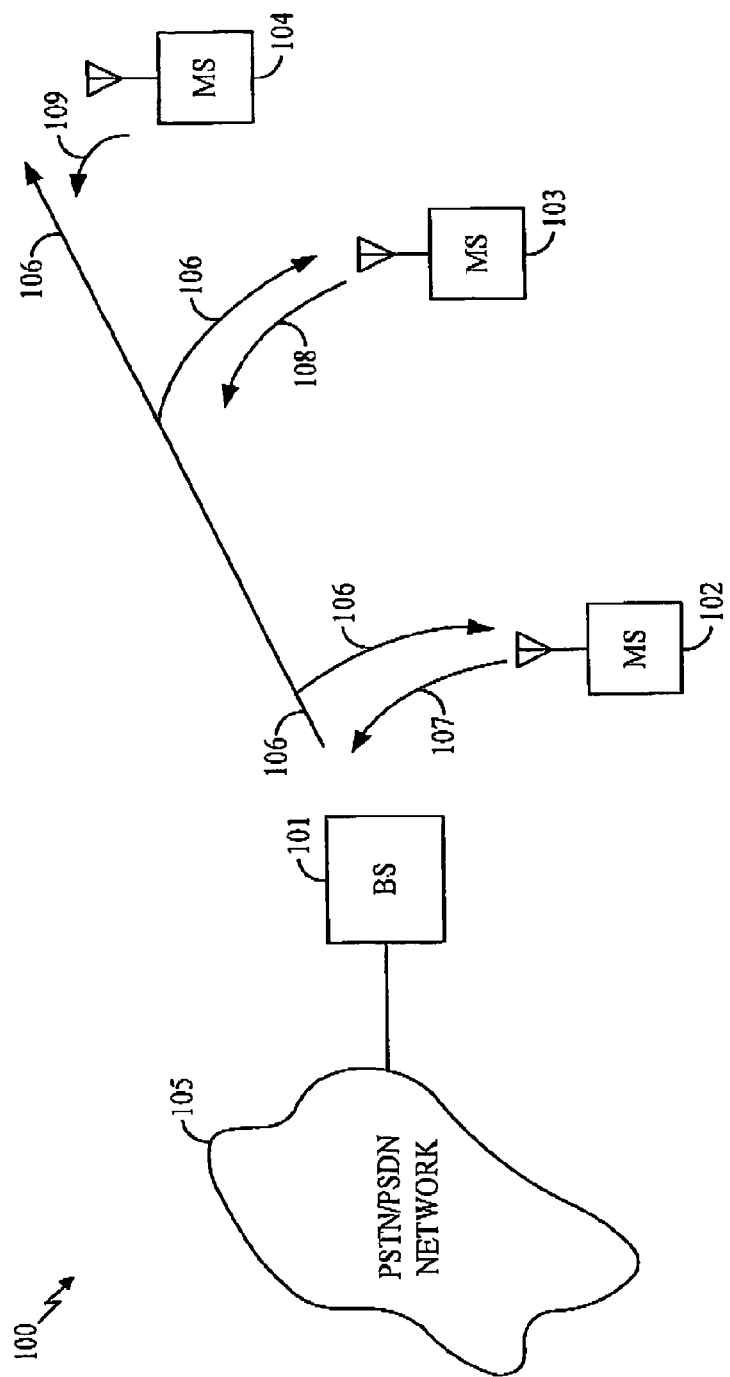
FIG. 1 illustrates a communication system capable of operating in accordance with various embodiments of the invention.

FIG. 1 illustrates a general block diagram of a communication system 100 capable of operating in accordance with any of the code division multiple access (CDMA) communication system standards while incorporating various embodiments of the invention. Communication system 100 may be for communications of voice, data or both. Generally, communication system 100 includes a base station 101 that provides communication links between a number of mobile stations, such as mobile stations 102–104, and between the mobile stations 102–104 and a public switch telephone and data network 105. Base station 101 may include a number of components, such as a mobile station controller, a base station controller and a radio frequency transceiver. For simplicity, such components are not shown. Base station 101 may also be in communication with other base stations (not shown.) Base station 101 communicates with each mobile station 102–104 via a forward link. The forward link may be maintained by a forward link signal transmitted from base station 101. The forward link signals targeted for mobile stations 102–104 may be summed to form a forward link signal 106. Each of the mobile stations 102–104 receiving forward link signal 106 decodes the forward link signal 106 to extract the information that is targeted for its user.

Mobile stations 102–104 communicate with base station 101 via corresponding reverse links. Each reverse link is maintained by a reverse link signal, such as reverse link signals 107–109 for respectively mobile stations 102–104. Each of the mobile stations 102–104 may transmit a pilot channel to base station 101. The pilot channel transmitted from a mobile station may be used for demodulating the information carried by the reverse link signal transmitted from the same mobile station. The use and operation of a pilot channel are well known. A transmitter and a receiver for communicating via the forward and reverse links are included in each mobile station 102–104 and base station 101. Various block diagrams for a transmitter are shown and described in the IS-95, IS-2000, IMT-2000, WCDMA and IS-856 standards.

Figure 2:
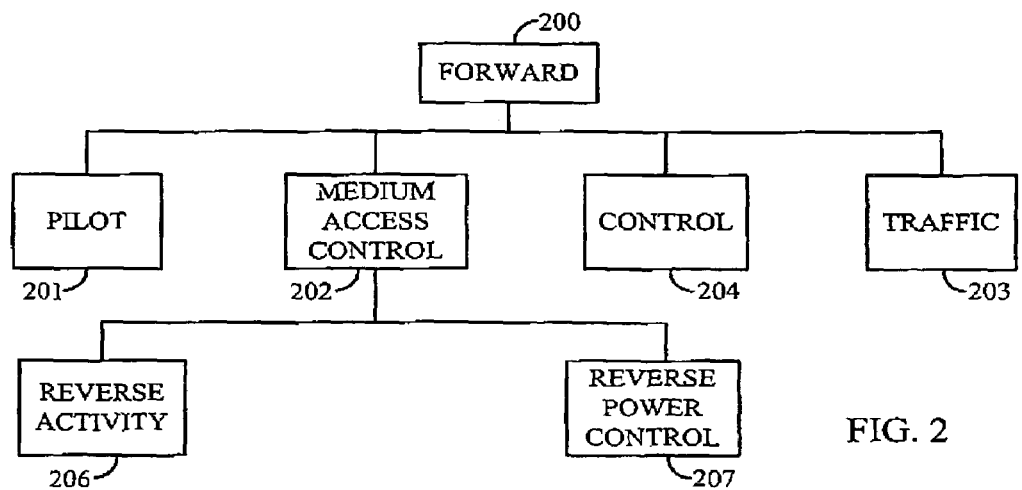
FIG. 2 illustrates an exemplary forward link channel structure.

FIG. 2 illustrates a forward channel structure 200 in accordance with an embodiment that may be used for communication on the forward link. Forward channel structure 200 may include a pilot channel 201, a medium access control (MAC) channel 202, a traffic channel 203 and a control channel 204. MAC channel 202 may include a reverse activity channel 206 and a reverse power control channel 207. Reverse activity channel 206 is used to indicate the activity level on the reverse link. Reverse power control channel 207 is used to control the power level at which a mobile station can transmit on the reverse link.

Figure 3:
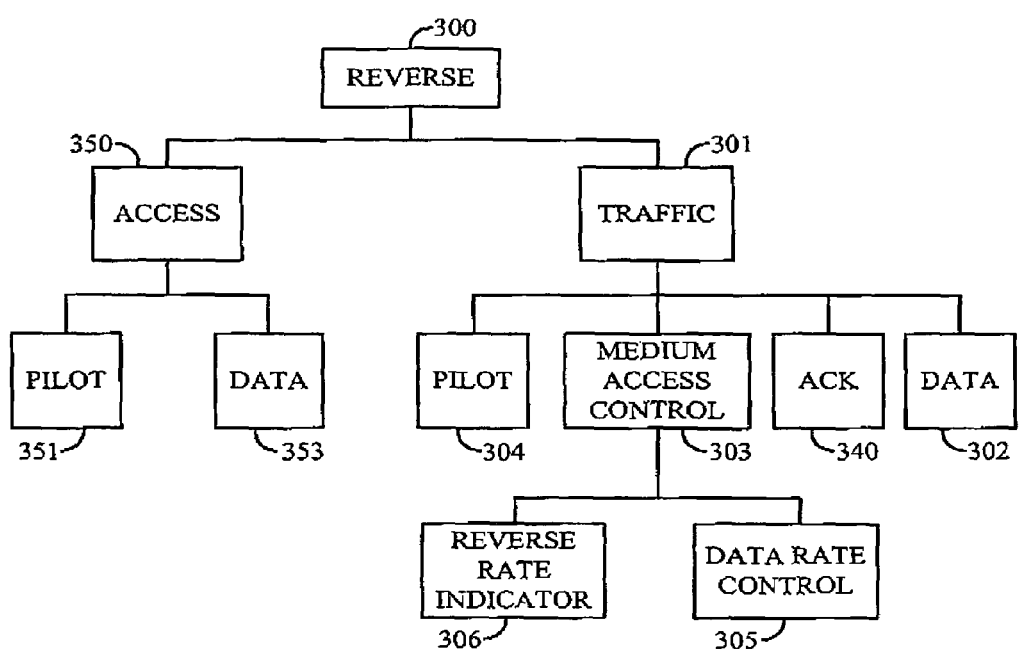
FIG. 3 illustrates an exemplary reverse link channel structure.

FIG. 3 illustrates, in accordance with an embodiment, a reverse channel structure 300 that may be used for communication on the reverse link. Reverse channel structure 300 includes an access channel 350 and a traffic channel 301. Access channel 350 includes a pilot channel 351 and a data channel 353. Traffic channel 301 includes a pilot channel 304, a MAC channel 303, an acknowledgment (ACK) channel 340 and a data channel 302. MAC channel 303 includes a reverse link data rate indicator channel 306 and a data rate control channel 305. ACK channel 340 is used for communicating whether a packet of data has been decoded successfully at a mobile station. Reverse rate indicator channel 306 is used for indicating the rate at which a mobile station is currently transmitting. Data rate control channel 305 indicates a data rate that a mobile station desires and/or is receiving on the forward link.

Figure 4:
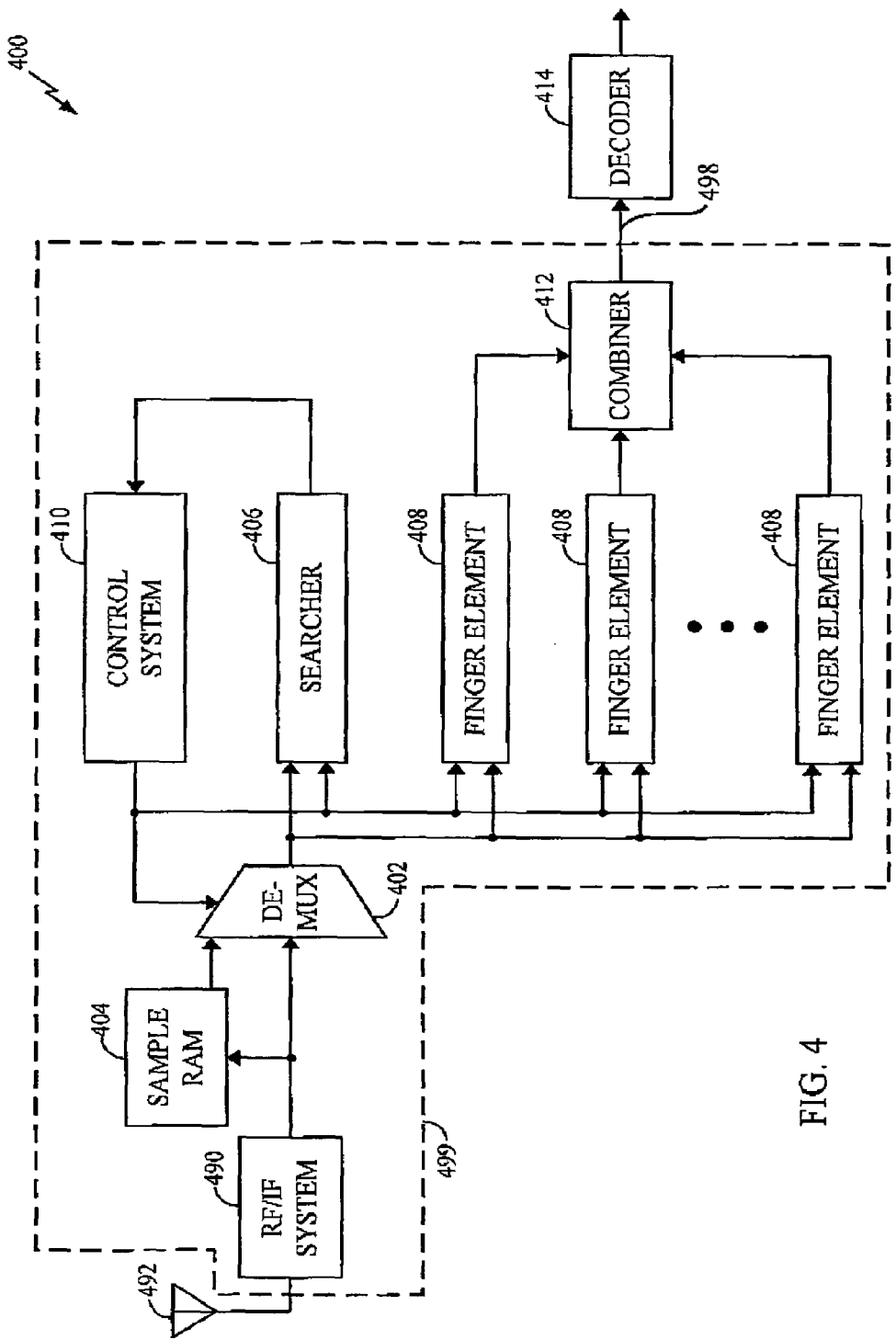
FIG. 4 illustrates a communication system receiver, for operation in a mobile station and a base station, capable of operating in accordance with various embodiments of the invention.

FIG. 4 illustrates a block diagram of a receiver 400 used for processing CDMA signals. Receiver 400 demodulates the received signal to extract the information carried by the received signal. Receiver 400 includes a processing block 499 that includes various operating blocks as shown to produce a signal 498 for a decoding operation. Receive (Rx) samples may be stored in RAM 404. Receive samples are generated by a radio frequency/intermediate frequency (RF/IF) system 490 and an antenna system 492. Antenna system 492 receives an RF signal, and passes the RF signal to RF/IF system 490. RF/IF system 490 may be any conventional RF/IF receiver. The received RF signals are filtered, down-converted and digitized to form RX samples at baseband frequencies. The samples are supplied to a demultiplexer (demux) 402. The output of demux 402 is supplied to a searcher unit 406 and finger elements 408. A control unit 410 is coupled thereto. A combiner 412 couples a decoder 414 to finger elements 408. Control unit 410 may be a microprocessor controlled by software, and may be located on the same integrated circuit or on a separate integrated circuit. The decoding function in decoder 414 may be in accordance with soft-output Viterbi algorithm concatenated, with or without feedback.

During operation, receive samples are supplied to demux 402. Demux 402 supplies the samples to searcher unit 406 and finger elements 408. Control unit 410 configures finger elements 408 to perform demodulation of the received signal at different time offsets based on search results from searcher unit 406. The results of the demodulation are combined and passed to decoder 414. Decoder 414 decodes the data and outputs the decoded data. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art. Receiver 400 may be used for decoding the information on reverse and forward links signals.

Each time a correlation process is started, searcher 406 and finger element 408 may start anew for determining demodulation of a pilot channel to test timing hypotheses and phase offsets. Searcher 406, or finger element 408, or searcher 406 and finger element 408 in combination may determine the carrier to interference ratio (C/I) for each received signal. The ratio Eb/I may be synonymous with the ratio C/I. The ratio Eb/I is a measure of carrier energy over interference per unit of a data symbol or data bit. Therefore, C/I and Eb/I may be interchangeable in some respects. The interference may typically be defined as the power spectral density of interference and the thermal noise.

To control interference and maintain an adequate system capacity while allowing adequate reception at a receiving end, the system controls the gain level of each transmitted channel from each transmitting source. The gain level of each channel may be adjusted by adjusting the channel data rate or power level or both the data rate and the power level. The gain level of a channel is based on the data rate of the encoded information at the transmitter and the power level at which the channel is transmitted via a signal. Generally, a channel at high data rate requires higher power level to overcome the interference. A channel at low data rate requires less power to overcome the same interference level. Therefore, the gain of a channel may be adjusted by adjusting the power level, the data rate or both the power level and the data rate.

Various power control schemes for controlling power levels of signals and various schemes for controlling data rate of a channel are known. The various standards incorporated by reference herein provide one or more schemes for controlling power level of a signal and data rate of a channel. The power level of a channel may be controlled by two independent power control loops, namely an open loop and a closed loop. The open loop power control is based on the need of the receiver to maintain an adequate communication link with the transmitter. The data rate adjustment is generally for allowing a quality of reception at a receiving end, and for controlling interference in a coverage area. When the feedback quality measurement is indicating poor reception, the data rate may be lowered while keeping the power level constant to improve the quality of reception and to overcome the effect of the interference. The data rate may also be lowered to allow other users to receive communications at a higher data rate.

According to at least one of the CDMA Spread Spectrum System standards, incorporated by reference herein, the mobile station may adjust the output power level by attributes of a code channel. The mobile station may maintain a power level ratio between the code channel power level and the reverse pilot channel power level. The ratio may be set according to the data rate used in the code channel. Generally, a table provides the values for the ratio at different data rates. The ratio generally increases for higher data rates. A ratio equal to one or less than one may also be possible. At a ratio equal to one, the power level of the pilot channel as set by the power control loop is equal to the power level of the code channel. During transmission of data on a traffic channel, the data rate and the traffic channel power level may be adjusted. Once an allowable data rate is selected, a corresponding channel power with respect to the reverse link pilot power level is used to set the traffic channel power level.

In data mode, a base station may be providing communication links to a large number of mobile stations at different data rates. For example, one mobile station in a forward link connected state may be receiving data at a low data rate, and another mobile station receiving at a high data rate. On the reverse link, the base station may be receiving a number of reverse link signals from different mobile stations. A mobile station based on an independent forward link measurement may request a desired data rate from the base station. The desired forward link data rate may be communicated to the base station via data rate control (DRC) channel 305. The data rate may also be selected by the base station based on certain metrics. The metrics may include the transmit power level of the power control sub-channel and/or power level of one or more forward traffic channels. The base station attempts to provide a forward link data transfer at the requested data rate.

The gain level of a channel as set by the transmitter through adjustments of the channel power level and the data rate may be based on a C/I level of a received signal at a receiving end. Receiver 400 may measure the C/I level of each received signal as described. The receiver reports the C/I measurement to the transmitter. The transmitter, after comparing the reported C/I to a target C/I threshold, adjusts the channel gain level of the channel to maintain the target C/I at the receiver. The signals between the transmitter and the receiver may propagate through a channel with various fading conditions before being received at the receiver. The C/I level may change continuously from one level to another. The control loop used for controlling gain level of a channel may use a C/I target threshold level such that the frame error rate is maintained at an adequate level. The C/I target threshold may be selected and maintained such that the adjusted channel gain is at a level above the minimally required level for maintaining an adequate frame error rate for at least a period of time after the reporting of the channel C/I condition to account for the variations in the channel between the reporting time and the actual transmission time of the signal. As such, the channel gain is maintained at the minimum level plus a margin.

There may be a delay between the time when the C/I level is measured and reported and the time when the channel gain level is subsequently selected and transmitted from the transmitter. As such, by allowing the channel gain to be above the minimum level, in a fading channel condition, the frame error rate is maintained at an adequate level most of the time in a predictive manner. The excess gain margin allows communication at a lower data rate, a higher power level or both with respect to the minimum gain level. Communications at low data rates require less power than communications at high data rates. Therefore, to add a gain margin by changing the data rate, the data rate may be lowered while keeping the power level unchanged. If the data rate is maintained at the same level, the channel gain may be increased by increasing the power level. The power level and data rate may be changed to achieve a higher channel gain corresponding to the gain margin.

Figure 5:
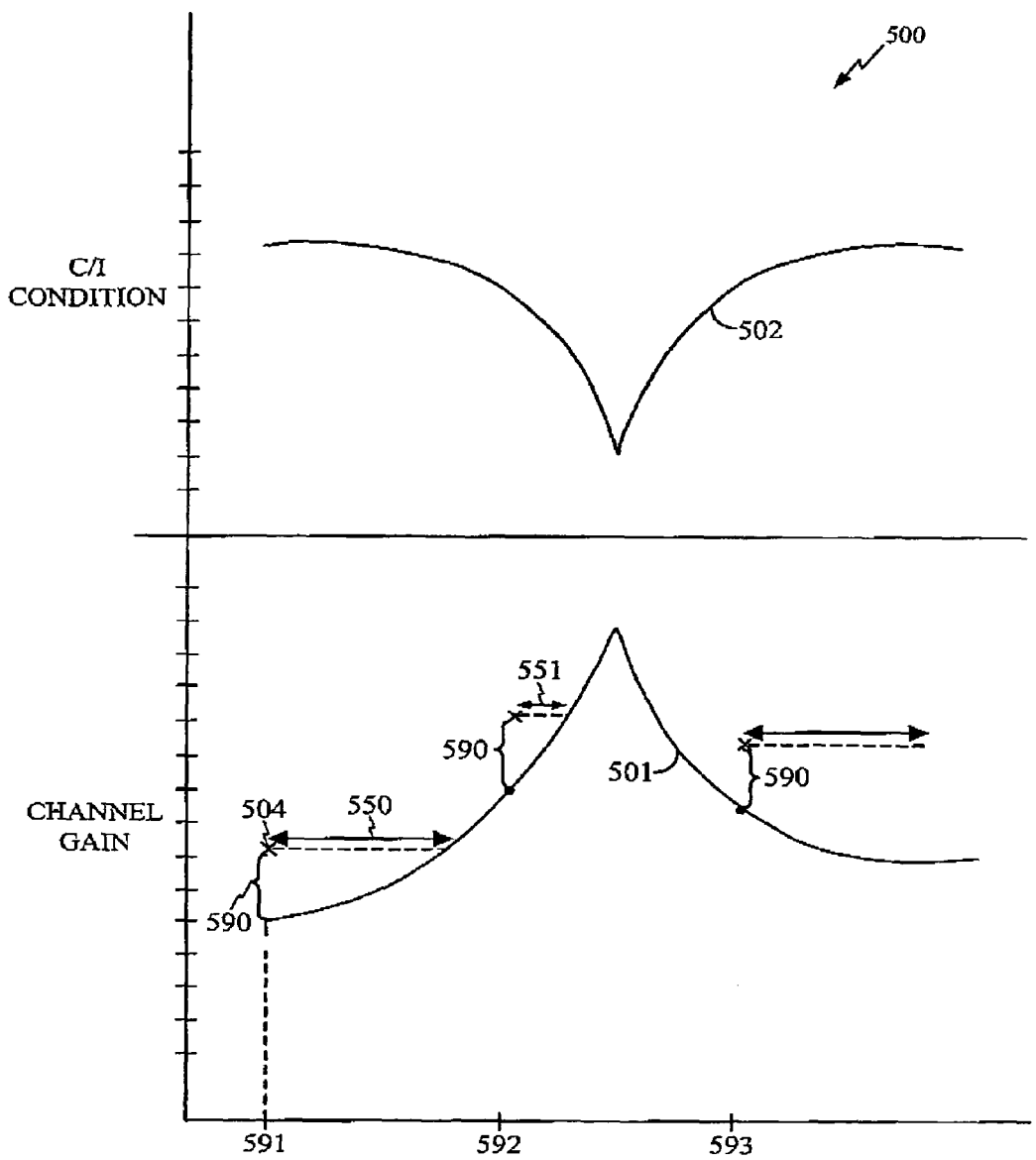
FIG. 5 illustrates an exemplary channel C/I condition and associated channel gain level.

Referring to FIG. 5, a graph 500 depicts an example of a channel C/I condition 502 and the minimum required channel gain 501 with respect to time. The minimum required channel gain 501 is sufficient to maintain an adequate communication link between a transmitter and a receiver for the channel C/I condition 502 at the receiver, for example. The gain of the channel is at a peak level when the channel C/I condition is at a bottom point. At a time 591, the gain of the channel for transmission to the receiver may be set at a gain level 504. The excess margin 590 between the minimum gain level 501 and the selected gain level 504 at time 591 allows the communications over the channel to be at an adequate frame error rate under most fading conditions for at least some time. By allowing the excess gain margin, the selected gain level 504 is sufficient to maintain an adequate communication between the transmitter and the receiver for at least a period of time 550, for example. The excess margin provides the protection if the channel C/I condition degrades during time period 550. If the channel C/I condition improves during the time period 550, thus requiring a lower gain level, the effective excess margin is in effect higher than the selected excess gain margin 504. As such, the receiver is able to receive at an adequate frame error rate under most channel conditions.

At time 592, the excess margin 590 allows protection against changing the channel condition for a period of time 551. The period of time 551 is less than time period 550 due to the rate at which the channel condition is changing. The channel condition is changing less rapidly during time period 550 than time period 551. At time 593, the excess margin 590 provides protection against any change in the channel condition for a much longer time. The corresponding C/I channel condition at time 593 is improving thus requiring a lower channel gain at the actual transmission time. The rate at which a channel C/I condition changes has a direct correlation with the speed at which the transmitter and receiver are separating from each other and/or the rate at which the propagation channel is changing.

Generally speaking, various aspects of the invention provide for an efficient gain control of a communication at various conditions. In a code division multiple access communication system 100, a rate of change of a carrier to interference ratio (C/I) of a communication channel received at a receiver 400 is determined. In accordance with an embodiment, a gain level of the communication channel at a transmitter may be based on the rate of change of the C/I of the communication channel. While referring to FIG. 5, for example, the rate of change of C/I at time 591 is different than the rate of change at times 592 and 593. If the rate of change of the C/I is positive, a gain margin is subtracted from the gain level of the communication channel to produce a final gain level for transmission of the communication channel in accordance with an embodiment. The channel condition is improving when the rate of change of the C/I is positive. For example, the rate of change of the C/I is positive at time 593. The C/I is increasing at the time 593. Therefore, at a time 593, in accordance with an embodiment, a gain margin is subtracted from the gain level of the communication channel to produce a final gain level for transmission of the communication channel.

The magnitude of the gain margin may correspond proportionally to a magnitude of the rate of change of the C/I in accordance with an embodiment. If the positive rate of change of the C/I is large, the channel condition is improving at a more rapid rate than when the positive rate of change of the C/I is small. Therefore, in a predictive manner, the channel condition requires a final gain level that is far less than what was estimated in a channel with large positive rate of change of the C/I. As such, the magnitude of the gain margin may be larger in a channel condition with large positive rate of change of the C/I than in a channel condition with small positive rate of change of the C/I. To effect subtracting the gain margin, the data rate of the communication channel may be increased in accordance with an embodiment. The data rate may be increased because the channel condition is improving when the rate of change of the C/I is positive. Therefore, in a predictive manner, the channel is able to sustain a communication link at a higher data rate. The power level of the communication channel may be decreased in accordance with an embodiment to effect subtracting the gain margin. The power level may be decreased because the channel condition is improving when the rate of change of the C/I is positive. To effect subtracting the gain margin, the power level may be decreased and data rate increased at the same time in accordance with an embodiment. Therefore, in a predictive manner, the channel is able to sustain a communication link at the same data rate and at a lower power level.

If the rate of change of the C/I is negative, a gain margin is added to the gain level of the communication channel to produce a final gain level for transmission of the communication channel in accordance with an embodiment. The channel condition is degrading when the rate of change of the C/I is negative. For example, the rate of change of the C/I is negative at times 591 and 592. The C/I is decreasing at times 591 and 592. Therefore, in accordance with an embodiment, a gain margin is added to the gain level of the communication channel to produce a final gain level for transmission of the communication channel at times 591 and 592.

The magnitude of the gain margin may correspond proportionally to a magnitude of the rate of change of the C/I in accordance with an embodiment. If the negative rate of change of the C/I is large, the channel condition is degrading at a more rapid rate than when the negative rate of change of the C/I is small. Therefore, in a predictive manner, the channel condition requires a final gain level that is far more than what was estimated in a channel with large negative rate of change of the C/I. As such, the magnitude of the gain margin may be larger in a channel condition with large negative rate of change of the C/I than in a channel condition with small negative rate of change of the C/I. The negative rate of change at time 591 is smaller than the negative rate of change at time 592. Therefore, the magnitude of the gain margin at time 591 is smaller than the magnitude of the gain margin at time 592 in accordance with an embodiment.

To effect adding the gain margin, the data rate of the communication channel may be decreased in accordance with an embodiment. The data rate may be decreased because the channel condition is degrading when the rate of change of the C/I is negative. Therefore, in a predictive manner, the channel is able to sustain a communication link at a lower data rate while avoiding frame erasure. Moreover, to effect adding the gain margin, the power level of the communication channel may be increased in accordance with an embodiment. The power level may be increased because the channel condition is degrading when the rate of change of the C/I is negative. To effect adding the gain margin, the data rate may be decreased and the power level decreased at the same time. Therefore, in a predictive manner, the channel is able to sustain a communication link at the same data rate and at a higher power level.

Figure 6:
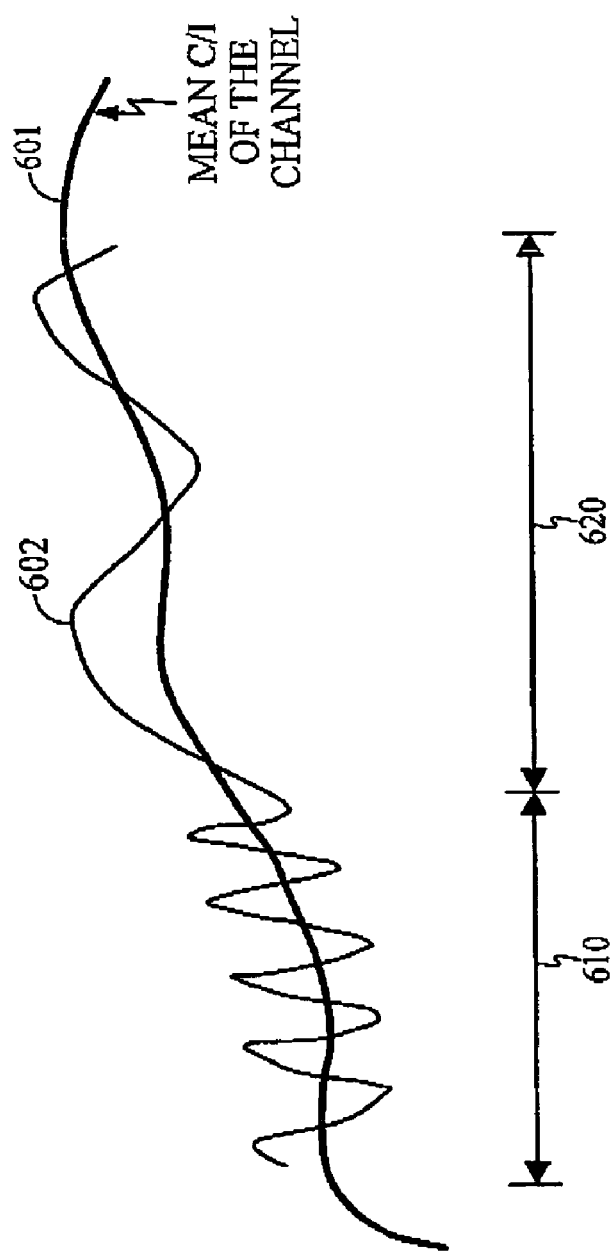
FIG. 6 illustrates an exemplary channel mean C/I condition and instantaneous channel C/I level over a period of time at different mobility levels.

The channel condition between the transmitter and the receiver may be dynamic. Fast fading condition may be referred to as the high mobility condition, and slow fading condition may be referred to as the low mobility condition. Referring to FIG. 6, an example of the C/I condition of a channel is shown. At time 610, the channel may be in a fast fade condition, and at time 620 at a slow fade condition, for example. The mean C/I 601 is the average C/I of the channel over a period of time. The instantaneous C/I 602 of the channel crosses mean C/I 601 at different times. The number of times that instantaneous C/I 602 crosses mean C/I 601 is higher in fast fade condition corresponding to time 610 than slow fade condition corresponding to time 620. The number of times that instantaneous C/I 602 crosses mean C/I 601 may be proportional to the mobility level of the communication channel in communication system 100. Therefore, the mobility level of the receiver 400 may be determined by determining the number of times that instantaneous C/I 602 crosses mean C/I 601.

In accordance with an embodiment, the mobility level of a communication channel in communication system 100 may be determined by determining the number of times that the instantaneous C/I of the channel crosses the mean C/I of the channel. The mobility level may be compared to a mobility threshold. The mobility threshold may correspond to a low mobility level. If the mobility level meets the low mobility threshold, the gain level of the communication channel between a transmitter and receiver 400 in communication system 100 may be based on the rate of change of C/I in accordance with an embodiment. If the mobility level is below the low mobility threshold, the channel condition corresponds to a low mobility condition. At low mobility condition, the channel condition may change slowly, thus allowing the gain level of the channel to be based on the rate of change of the C/I in a predictive manner in accordance with an embodiment.

Figure 7:
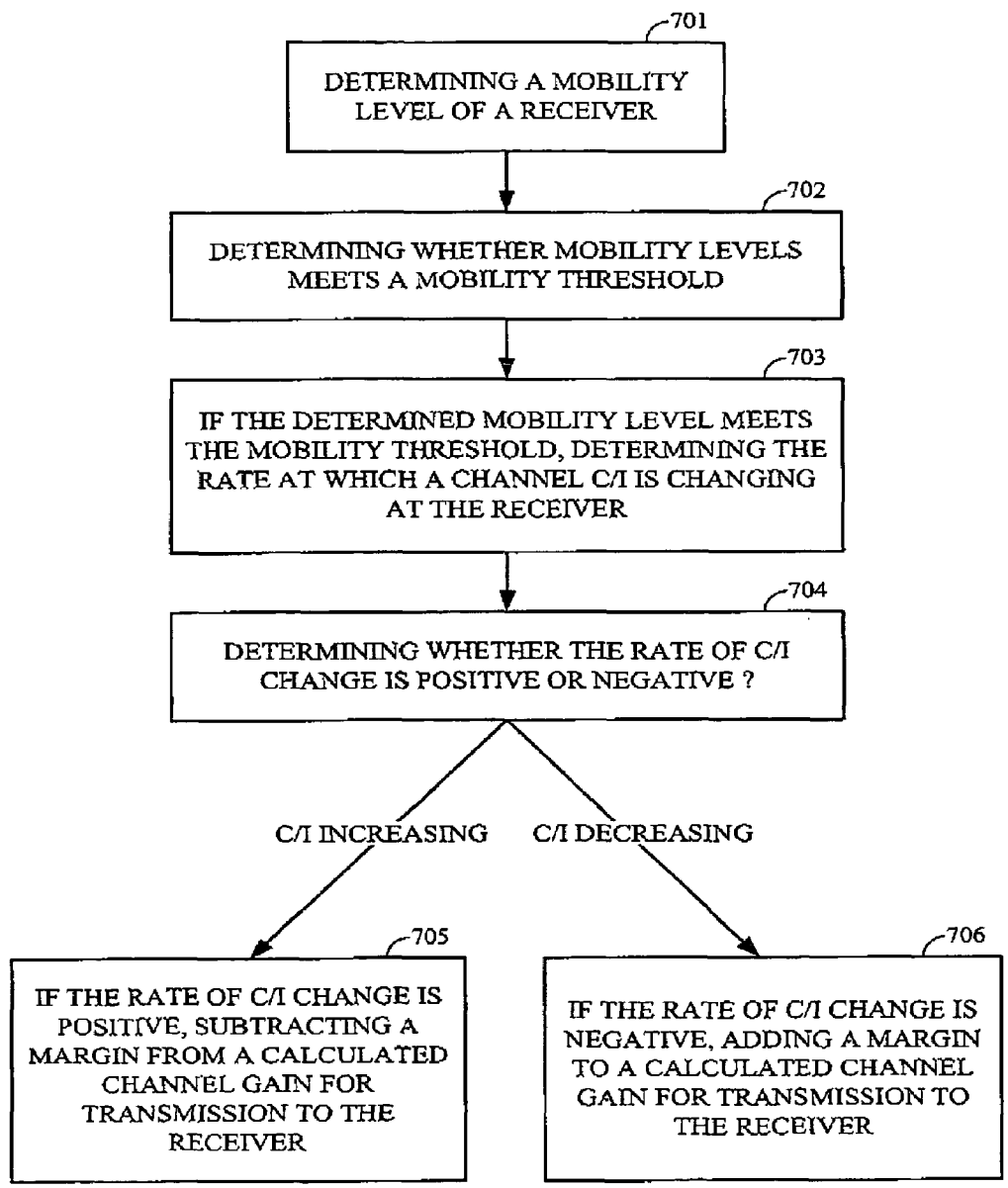
FIG. 7 illustrates a flow chart for controlling gain level of a communication channel in accordance with various embodiments.

Referring to FIG. 7, a flow chart 700 may be followed for implementing various aspects of the invention. At a step 701, the mobility level of the receiver may be determined. The mobility level is compared to a low mobility threshold at step 702. The low mobility threshold may correspond to a low mobility level condition. If the mobility level is less than the low mobility threshold, the rate at which the channel C/I is changing is determined at step 703. At step 704, a controller, such as control system 410 in receiver 400, may determine whether the rate of change of C/I is positive or negative. At step 705, if the rate of change is positive, a gain margin is subtracted from the minimum gain of the channel in accordance with an embodiment. At step 706, if the rate of change is negative, a gain margin is added to the minimum gain of the channel in accordance with an embodiment. The channel may be transmitted at the adjusted gain level.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. In a code division multiple access communication system, a method comprising:
    determining a received carrier to interference ratio (C/I) of a communication channel;
    determining a received rate of change of the C/I of the communication channel;
    determining a minimum gain level of said communication channel based on said determined C/I;
    determining a gain margin of said communication channel based on said rate of change of said C/I;
    determining a gain level of said communication channel based on said minimum gain level and said gain margin for transmission of data over said communication channel to a receiver.

2. The method as recited in claim 1 wherein a magnitude of said determined gain margin corresponds proportionally to a magnitude of said determined rate of change of said C/I.

3. The method as recited in claim 1 further comprising transmitting data over said communication channel to said receiver at said determined gain level.

4. The method as recited in claim 1 further comprising:
    determining a mobility level of said communication channel;
    determining whether said determined mobility level meets a mobility threshold, wherein said determining said gain margin of said communication channel is based on whether said determined mobility level meets said mobility threshold.

5. The method as recited in claim 1 wherein said transmission is in accordance with code division multiple access communication.

6. In a code division multiple access communication system, an apparatus comprising:
    a controller configured for:
        determining a received carrier to interference ratio (C/I) of a communication channel;
        determining a received rate of change of the C/I of the communication channel;
        determining a minimum gain level of said communication channel based on said determined C/I;
        determining a gain margin of said communication channel based on said rate of change of said C/I;
        determining a gain level of said communication channel based on said minimum gain level and said gain margin for transmission of data over said communication channel to a receiver.

7. The apparatus as recited in claim 6 wherein said determining a gain margin includes determining a magnitude of said determined gain margin proportionally to a magnitude of said determined rare of change of said C/I.

8. The apparatus as recited in claim 6 further comprising a transmitter for transmitting data over said communication channel to said receiver at said determined gain level.

9. The apparatus as recited in claim 6 wherein said controller is further configured for:
    determining a mobility level of said communication channel;
    determining whether said determined mobility level meets a mobility threshold, wherein said determining said gain margin of said communication channel is based on whether said determined mobility level meets said mobility threshold.

10. The apparatus as recited in claim 6 wherein said transmitter is configured for transmission in accordance with code division multiple access communication.

* * * * *

UNITED STATES PATENT AND TRADEMARK OFFICE
CERTIFICATE OF CORRECTION

PATENT NO. : 7,139,304 B2 Page 1 of 1
APPLICATION NO. : 09/928578
DATED : November 21, 2006
INVENTOR(S) : Jou It is certified that error appears in the above-identified patent and that said Letters Patent is hereby corrected as shown below:

On title page

Item (74) Attorney, Agent or Firm – should read -- Philip Wadsworth; Thien Nguyen; S. Hassain Beladi --

Signed and Sealed this

Twentieth Day of February, 2007

JON W. DUDAS
*Director of the United States Patent and Trademark Office*